G. A. SMART.
GARMENT AND BANDAGE FASTENER.
APPLICATION FILED OCT. 11, 1919.
1,355,431.  Patented Oct. 12, 1920.
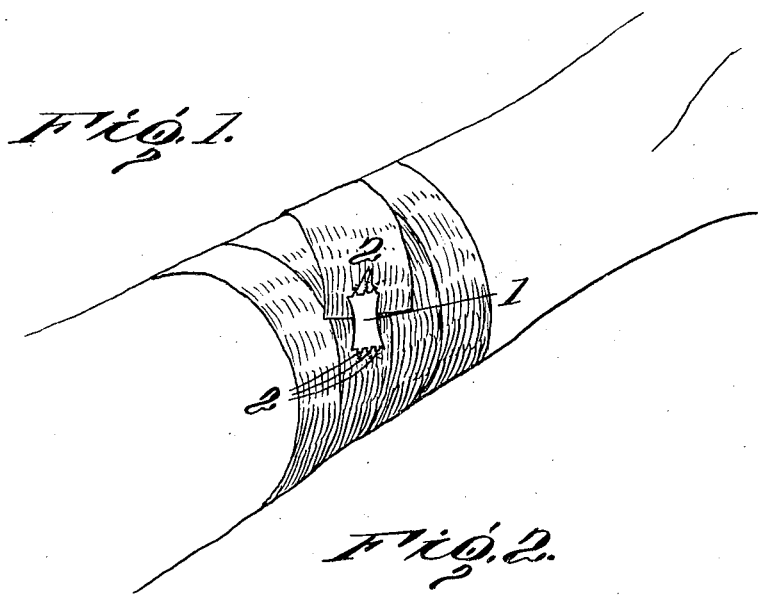
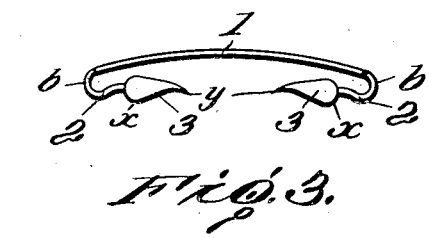
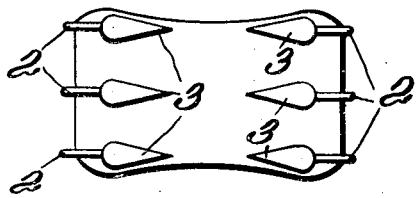
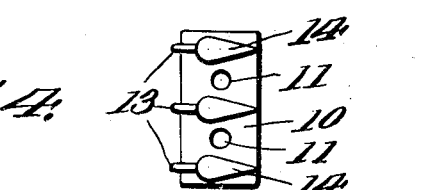
Inventor
Gertrude A. Smart
By
Attorney

UNITED STATES PATENT OFFICE.

GERTRUDE A. SMART, OF MADISON, NEBRASKA.

GARMENT AND BANDAGE FASTENER.

1,355,431. Specification of Letters Patent. Patented Oct. 12, 1920.

Application filed October 11, 1919. Serial No. 330,136.

*To all whom it may concern:*

Be it known that I, GERTRUDE A. SMART, a citizen of the United States, residing at Madison, in the county of Madison and State of Nebraska, have invented a new and useful Garment and Bandage Fastener, of which the following is a specification.

The present invention is a fastener particularly designed to secure the ends of bandages and for other kindred purposes.

The object of the invention is the provision of such a fastener which may be readily and conveniently attached or detached, but provided with means for preventing unintentional or accidental disengagement or detachment from the bandage or the like.

It is also the object of the invention to so construct or form the fastener as to eliminate the possibility of the fastening prongs or pins at any time pricking or otherwise injuring the skin of the user.

It is, further, the important object of the invention to provide a fastener as above described which is extremely easy and relatively inexpensive to manufacture, easy and convenient to manipulate, durable, attractive in appearance and in all respects highly efficient for its purposes.

The invention, moreover, resides in sundry details of construction, combination and arrangement hereinafter fully described.

In the accompanying specification and the annexed drawings, the invention is illustrated in the form considered to be the best, but it is to be understood that the invention is not limited precisely to such form, because it may be embodied in other forms; and it is also to be understood that in and by the claim following the description, it is intended to cover the invention in whatever other form it may be embodied.

In the drawing illustrating the invention,

Figure 1 shows the fastener applied to secure the end of a bandage,

Fig. 2 is an enlarged side elevation of the fastener,

Fig. 3 is an under view of the fastener, and

Fig. 4 is an under view of a modified form of the fastener.

The fastener according to the invention, is preferably made of gold, silver, nickel, or such other material, providing a neat and attractive appearance and which will not corrode, rust or soil the bandage or be injurious when contacting with skin or open wounds.

The fastener consists of a rectangular plate or body 1 slightly longitudinally curved to an arc, as shown in Fig. 2, and having a series of shanks 2 (preferably three in number and integral with the plate) on each end thereof. The shanks on each end of the plate have their inner ends bent to substantially " goose neck " formation, as at $b$, so that the outer ends extend toward each other and lie opposite the concaved face of the plate substantially parallel thereto, with a very slight clearance or space therebetween. The outer extremities of these shanks each have thereon and extending in same direction therewith, an enlarged piercing head 3, substantially conical-shaped, having its reduced end or piercing points extending outermost.

The extremities of the piercing points of the heads are very slightly offset laterally and outwardly, as indicated at Y, but do not extend out of the longitudinal plane of the heads. This permits the heads to readily engage and penetrate the fabric of the bandage, when the fastener is slightly pressed upon the fabric with a slight sliding movement, as will be readily understood, but does not enable them to prick or scratch the skin.

The larger end of each head 3 is of a greater diameter than that of the respective shanks in order to provide an annular shoulder 4, which resists accidental slipping or detachment of the fabric from the fastener. The walls of the shoulders are, however, rounded, as at $x$, to readily permit deliberate disengagement or detachment of the fastener from the fabric without tearing, ripping or defacing the latter. In furtherance of this, the shanks are made circular in cross section.

It is obvious, that once the fastener is secured or attached as shown in Fig. 1, it is held against all longitudinal and lateral movement which may tend to detach it from the fabric, unless deliberate and intentional effort is made.

The top face of the plate 1 may bear any desired ornamental design which will enhance its appearance.

In Fig. 4, is shown a modified form of fastener intended as a garment fastener. It consists of an attaching plate 10 having openings 11 for stitching or other securing means to pass therethrough, and further having a series of prongs 12 (preferably three in number) on one edge of the plate. The prongs comprise shanks 13 and heads 14 of the same construction and formation as above described.

The fasteners according to the invention can be made at very small expense and in great quantities on account of its simple construction.

I claim:

As an article of manufacture, the herein described fastener comprising a rigid plate having a plurality of shanks on each end thereof, said shanks projecting under the ends of said plate toward each other with their free ends lying substantially parallel to the under face of the plate, the extremities of said shanks having cone-shaped enlargements thereon terminating into piercing points, said piercing points being laterally offset and extending outwardly and lying within the confines of said enlargements.

In testimony whereof I have hereunto set my hand.

GERTRUDE A. SMART.